United States Patent [19]
Fogelberg et al.

[11] 4,098,379
[45] Jul. 4, 1978

[54] AUTOMATIC FOUR-WHEEL DRIVE TRANSFER CASE

[75] Inventors: Mark John Fogelberg; John William Holdeman, both of Muncie, Ind.

[73] Assignee: Borg-Warner Corporation, Chicago, Ill.

[21] Appl. No.: 641,781

[22] Filed: Dec. 18, 1975

[51] Int. Cl.² ............................................. F16D 15/00
[52] U.S. Cl. ........................................ 192/38; 192/47
[58] Field of Search ................. 192/38, 35, 36, 44, 192/47; 74/710, 710.5, 711; 180/44, 49

[56] References Cited

U.S. PATENT DOCUMENTS

| | | | |
|---|---|---|---|
| 2,959,237 | 11/1960 | Hill | 180/44 |
| 3,055,471 | 9/1962 | Ware et al. | 192/36 |
| 3,123,169 | 3/1964 | Young et al. | 192/36 |
| 3,194,369 | 7/1965 | Witte | 192/36 |
| 3,437,186 | 4/1969 | Roper | 192/38 |
| 3,481,436 | 12/1969 | Wilkowski | 192/35 |

*Primary Examiner*—Allan D. Herrmann
*Assistant Examiner*—R. C. Turner
*Attorney, Agent, or Firm*—Julian Schachner

[57] ABSTRACT

A power transfer mechanism incorporated in a multiple path drive system comprising a transfer case disposed between a source of input torque and a pair of drive axles. In one mode, torque is transferred directly to one drive axle and automatically to the other drive axle through a double-acting overrunning clutch when required. In another mode, torque is transferred to both drive axles in a locked-up condition.

19 Claims, 4 Drawing Figures

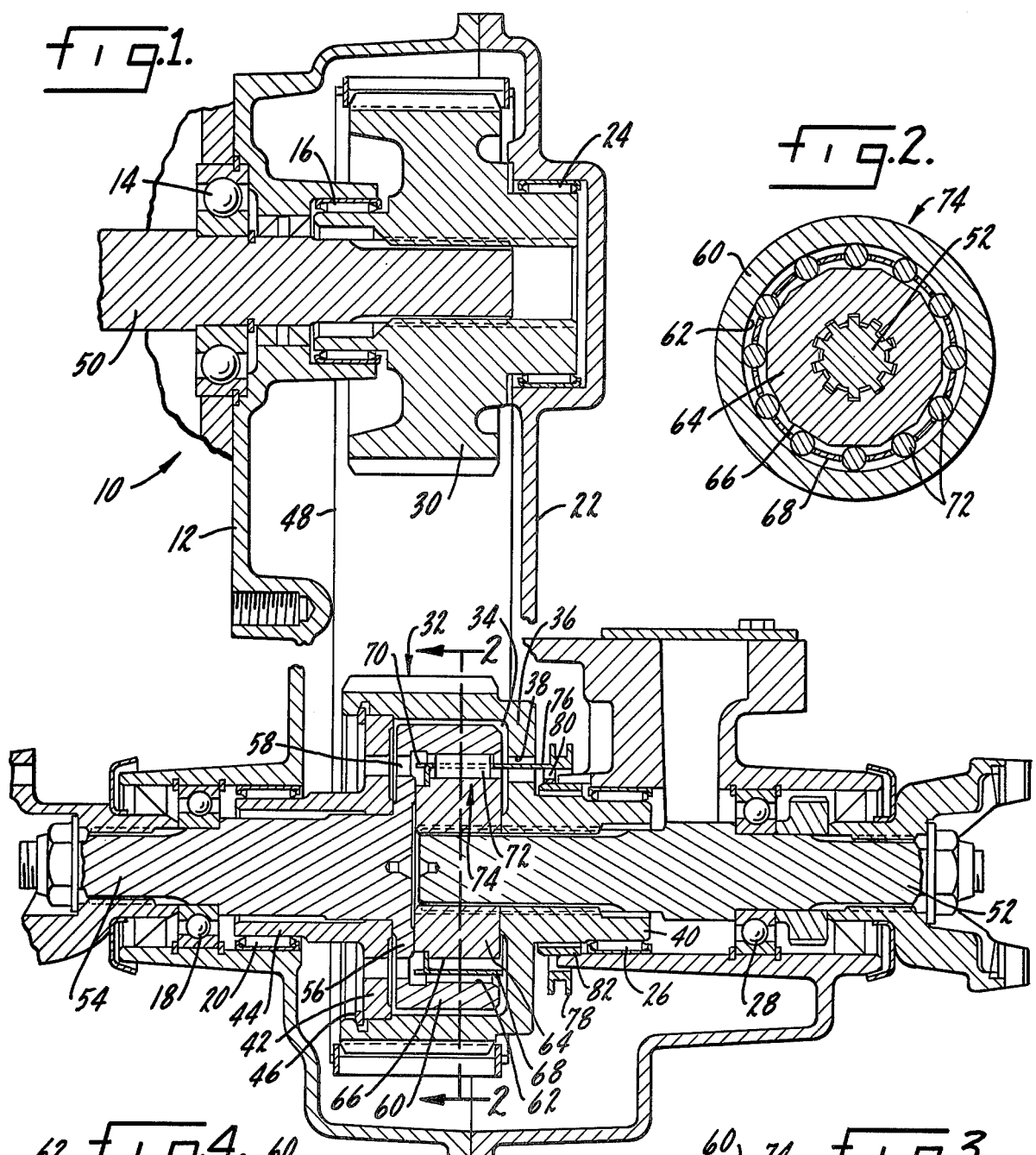
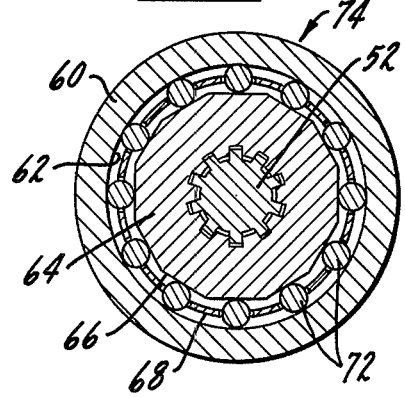
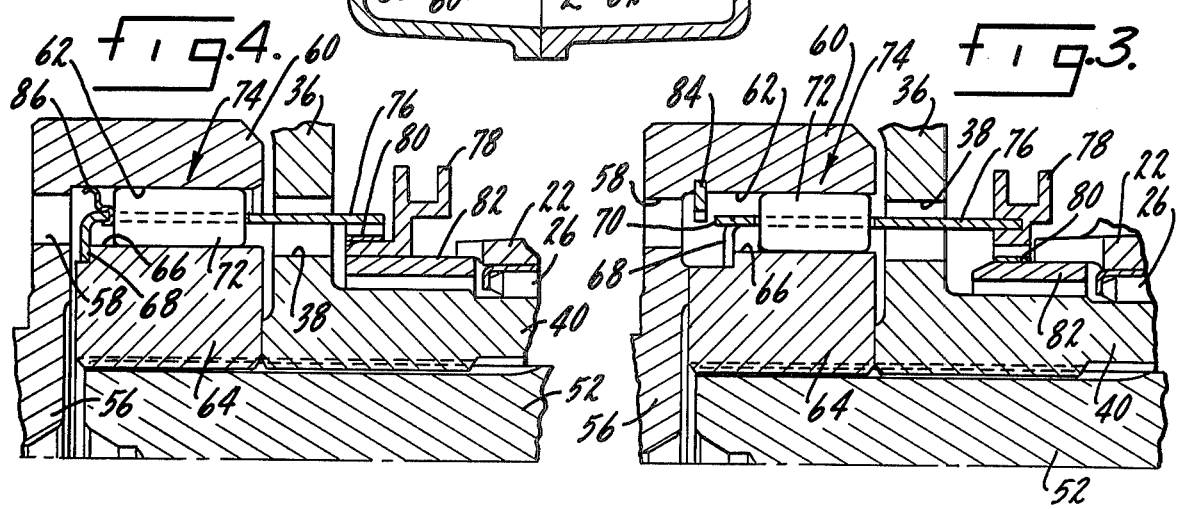

AUTOMATIC FOUR-WHEEL DRIVE TRANSFER CASE

BACKGROUND OF THE INVENTION

This invention relates generally to a power transfer mechanism adapted to be incorporated in a multiple path drive system, for example a four-wheel drive vehicle. More particularly, it relates to a torque transfer case adapted to receive torque from a prime mover and to provide torque for one drive axle where two-wheel drive is adequate, and for both drive axles where four-wheel drive is required.

In recent years there have been many improvements in automotive drive trains, including improvements relating to the transfer of torque from a prime mover to drive axles. Where four-wheel drive systems are used, transfer cases have been developed which generally provide torque transfer directly to one axle and selectively to another axle. Some such transfer cases have included an overrunning mechanism which automatically engages and disengages the four-wheel drive function. This automatic feature is desirable. However, when the system is in coast, and in particular when the vehicle is proceeding down a grade which could not be negotiated safely by a conventional two-wheel drive vehicle, engine braking is delivered only to the rear wheels in the automatic mode of operation. It is now known that under these conditions it is advantageous to have the capability of effecting a locked-up mode of operation in which the transfer case output shafts do not rotate with respect to each other. In this locked-up mode, a driver could rely on engine braking delivered to both front and rear wheels. Thus there remains a need to provide an improved torque transfer case having an overrunning mechanism which in one mode engages and disengages automatically, and in another mode provides positive engagement.

Accordingly, it is an object of this invention to meet the continuing need and desire in the art for improvements in a torque transfer mechanism which normally provides torque transfer to one output shaft for establishing a two-wheel drive condition, and which engages through an overrunning device to provide torque transfer to two output shafts for establishing a four-wheel drive condition. The mechanism includes a unique construction to condition the overrunning device to provide either automatic four-wheel drive or locked-up four-wheel drive, as desired by the operator.

SUMMARY OF THE INVENTION

This invention is directed in brief to an improved four-wheel drive transfer case of the type having an overrunning device therein, and is intended for use between a prime mover and a pair of drive axles. The mechanism includes a transfer case which, in one mode, is adaptable for transferring torque from an input to one output directly and to another output through a double-acting overrunning clutch. The clutch includes a cage which is frictionally biased to the case, thus tending to engage the clutch. The arrangement is such that the output connected with the front axle normally overruns the output connected with the rear axle. In this condition, the clutch tends to freewheel and no power is transmitted to the front axle. If the rear wheels lose traction in either direction of rotation, the rear output will speed up until it rotates at the same speed as the front output. The clutch then engages due to the frictional bias, and torque is transferred to the front output to drive the front axle as well as the rear axle. When traction is restored to the rear wheels, the clutch disengages and the system reverts back to a conventional two-wheel drive condition.

In another mode, the transfer case is adaptable for transferring torque from an input to both outputs directly. The clutch cage is frictionally biased to the overrunning clutch race. In this condition, as the output connected with the front axle tends to overrun, the clutch engages due to the frictional bias, and torque is transferred to both outputs. In addition, when the vehicle is going down a steep hill, all four wheels turn against engine compression, permitting control of vehicle speed and direction.

Thus the requirements of various vehicle manufacturers for improved automatic four-wheel drive power trains may be satisfied with a simplified and economical assembly, as will be described.

BRIEF DESCRIPTION OF THE DRAWING

The objects and advantages of this invention will become apparent to those skilled in the art upon careful consideration of the specification herein, including the drawing, wherein:

FIG. 1 is a sectional view showing the torque transfer case;

FIG. 2 is a sectional view taken along the line 2—2 of FIG. 1 showing details of the double-acting overrunning clutch;

FIG. 3 is an enlarged view of a portion of FIG. 1 showing details of a modified biasing mechanism; and FIG. 4 is an enlarged view of a portion of FIG. 1 showing details of another modified biasing mechanism.

While this invention is susceptible of embodiment in many different forms, there is shown in the drawing and will herein be described in detail a preferred embodiment with the understanding that the present disclosure is to be considered as an exemplification of the principles of the invention and is not intended to limit the invention to this embodiment.

DESCRIPTION OF THE PREFERRED EMBODIMENT

Referring now to the drawing in greater detail, there is shown generally a torque transfer case 10 particularly adapted for use in an automotive vehicle incorporating a four-wheel drive system. Torque transfer case 10 is suitable for transmitting torque from a prime mover through a plurality of drive axle assemblies to drive front and rear pairs of traction wheels.

Torque transfer case 10 includes a first housing section 12 which supports bearings 14, 16, 18 and 20. Torque transfer case 10 also includes a second housing section 22 suitably secured to housing section 12. Bearings 24, 26 and 28 are supported by housing section 22.

A first sprocket 30 is journalled in bearings 16 and 24. A second sprocket 32 defines an interior pocket 34 and includes a flange 36 which in turn defines a plurality of openings 38 extending therethrough and spaced around its periphery to communicate pocket 34 with the exterior thereof. Sprocket 32 also includes an annular extension 40 extending outwardly from flange 36. Also forming a portion of sprocket 32 is a flange 42 having an annular extension 44 extending outwardly therefrom. Flange 42 is secured to sprocket 32 by means of a locking ring 46 or the like. Sprocket assembly 32 is journalled in bearings 20 and 26. A suitable chain 48 couples sprockets 30 and 32. Sprocket 30, chain 48 and sprocket 32 form a chain drive train.

An input shaft 50 is journalled in bearing 14 and extends into transfer case 10. Input shaft 50 is splined to sprocket 30, and is adapted to receive torque, for example, from an associated transmission of an automotive vehicle. It should be understood that input shaft 50 may be the output shaft of such a transmission.

A rear output or propeller shaft 52 is journalled in bearing 28 and extends into transfer case 10. Output shaft 52 is splined to extension 40 of sprocket 32.

A front output or propeller shaft 54 is journalled in bearing 18. Output shaft 54 extends into transfer case 10 and includes an upstanding flange 56 which in turn defines a plurality of openings 58. Output shaft 54 also includes an annular extension 60 within pocket 34 of sprocket 32. Extension 60 defines an outer clutch race 62 of cylindrical configuration.

An annular element or cam 64 is splined to output shaft 52 to provide relatively loose engagement therewith. This loose engagement is obtained by a clearance of up to several thousandths of an inch in the spline connection. Cam 64 is within pocket 34 and defines an inner clutch race 66 comprising a plurality of flats or ramp surfaces. This arrangement is disclosed in detail in Kelbel application Ser. No. 603,834 filed Aug. 11, 1975, and now abandoned. This application is copending and of common assignee herewith, and is incorporated herein by reference.

As shown in FIG. 1, an annular cage 68 defines a plurality of tabs 70. Cage 68 supports a plurality of wedging elements 72, one of which is associated with each flat of inner race 66. Extension 60, cam 64, races 62 and 66, cage 68 and wedging elements 72 comprise together a double-acting overrunning clutch 74. In one preferred form of the invention, wedging elements 72 are rollers, and clutch 74 is a roller clutch.

The relatively loose fit between cam 64 and output shaft 52 allows slight movement of cam 64, which is sufficient such that cam 64 is self-centering on rollers 72. This avoids eccentricity which could result in uneven loading, thus allowing for an equitable distribution of the load transferred through clutch 74 and tending to balance the forces acting thereon.

Roller cage 68 defines a plurality of fingers 76 extending through openings 38 of sprocket 32. A collar 78 is secured to fingers 76. Carried by fingers 76 is at least one drag shoe 80. A wear ring 82 is press fit to housing section 22 for frictional contact by drag shoe 80, so as to establish smooth frictional engagement with housing section 22. Drag shoe 80 may be spring biased into frictional contact with wear ring 82. As a result, balanced radial forces are developed which cause a relative drag effect on cage 68. This effect is disclosed in detail in Fogelberg application Ser. No. 572,690 filed Apr. 28, 1975, now U.S. Pat. No. 3,993,152. Alternative structure for developing this drag effect is disclosed in detail in Fogelberg application Ser. No. 603,833 filed Aug. 11, 1975 and in Fogelberg and Kelbel application Ser. No. 637,923 filed Dec. 5, 1975 and now abandoned. These applications are copending and of common assignee herewith, and are incorporated herein by reference.

Collar 78 may be shifted from the position shown in FIG. 1, wherein cage 68 is frictionally biased by housing section 22, leftwardly to a position wherein this frictional bias is broken and tabs 70 are positioned in openings 58 of flange 56. In this position, cage 68 is locked to annular extension 60 for movement with outer clutch race 62.

Operation of transfer case 10 is as follows. Torque is received by input shaft 50 and is transferred through the chain drive train to drive output shaft 52. In one preferred form of the invention, output shaft 52 may be connected to a rear drive axle assembly of an associated vehicle. Output shaft 54 may be connected to the front drive axle assembly of an associated vehicle.

Output shaft 54 normally rotates faster than output shaft 52. This is inherent when the vehicle is turning, since the front wheels travel through a larger radius than do the rear wheels. For straight ahead movement, this may be accomplished by providing front and rear axles having slightly different gear ratios, front wheels slightly smaller than rear wheels, or by inflating the front tires to a pressure slightly less than that in the rear tires. Other suitable means may be provided for causing output shaft 54 normally to overrun output shaft 52.

Annular extension 60 rotates with output shaft 54. Cam 64, although loosely splined to output shaft 52, nevertheless rotates therewith. Thus, outer race 62 rotates faster than inner race 66 under normal conditions. Roller cage 68 is rotated, and fingers 74 carry drag shoe 80. Due to the frictional engagement of drag shoe 80 with housing section 22, balanced radial forces are developed which result in a relative drag effect on roller cage 68. This relative drag effect is developed without any axial forces acting on roller cage 68, and thus there is no tendency for roller cage 68 to bind.

With reference to FIGS. 1 and 2, the mechanism is shown in the automatic position. Assume that output shaft 52 and cam 64 are rotating in the clockwise direction. Output shaft 54 and extension 60 also are rotating in the clockwise direction, but at a slightly faster speed. The drag effect on roller cage 68 causes rollers 72, in effect, to rotate relatively in the counterclockwise direction. Rollers 72 tend to wedge between inner race 66 and outer race 62 so as to engage clutch 74. However, due to the fact that extension 60 is rotating faster than cam 64, a force is developed which acts on rollers 72 such that they will be carried in the clockwise direction, relatively, away from their engaged position. Thus, the relative rotation between extension 60 and cam 64 prevents engagement of clutch 74. As a result, torque is transferred to output shaft 52 but not to output shaft 54. In this condition, the operation is essentially that of a conventional two-wheel drive vehicle.

If the rear wheels lose traction, output shaft 52 will speed up until it is rotating at the same speed as is output shaft 54. The drag effect on roller cage 68 will cause rollers 72 to wedge between inner race 66 and outer race 62 when output shafts 52 and 54 are rotating at the same speed. When this takes place, torque will be transferred both to output shaft 52 and through clutch 74 to output shaft 54. In this condition, the operation is essentially that of a conventional four-wheel drive vehicle in locked-up mode.

When the rear wheels regain traction, output shaft 52 will slow down, and output shaft 54 will again overrun output shaft 52. Rollers 72 will be carried away from their engaged position toward a freewheeling position, thereby disengaging clutch 74 and restoring the vehicle to the two-wheel drive condition. Thus, it will be seen that the transfer case provides for establishment of four-wheel drive automatically as required, and for establishment of two-wheel drive automatically when four-wheel drive is not required. This automatic engaging and disengaging feature is provided when the vehicle is moving in either the forward or reverse directions; that is, when output shafts 52 and 54 are rotating in either the clockwise or counterclockwise directions as shown in FIG. 2.

In the automatic mode of operation, relative rotation between extension 60 and cam 64, with extension 60 overspeeding, normally prevents clutch 74 from engaging by causing rollers 72 to move slightly, relatively, away from a wedging position on clutch races 62 and 66. This results in slight rotational displacement of cage 68 toward the central or freewheel position. Excessive overspeed of overrunning race 62 could pull cage 68 and rollers 74 beyond the central position into an undesirable clutch-engaging position on the opposite side of cam 64. This may occur under unusual operating conditions. For example, a tire blowout would cause the rolling radius of that wheel to become suddenly reduced. Such changes in the characteristics of a vehicle driveline would create a potentially dangerous condition. Similarly, shocks due to jerks, bumps, etc., could cause instantaneous excessive overspeed of the overrunning race sufficient to pull the rollers beyond the freewheel position to create the same potential danger when operating in the automatic mode.

This condition is sensitive not only to the percentage overrun of the outer race, but also to the gross vehicle speed. Centrifugal force effects on the rollers tend to drag them, and the cage, toward lock-up on the opposite side of the cam. While enough frictional drag on the cage to prevent this could be built into the system, the amount of drag required would be wasteful of power and could lead to excessive wear under normal operating conditions in the automatic mode. Suitable structure for preventing this undesirable lock-up on the opposite side of the cam is disclosed in detail in Fogelberg application Ser. No. 615,001 filed Sept. 19, 1975 and in the aforementioned Fogelberg and Kelbel application Ser. No. 637,923 filed Dec. 5, 1975. These applications are copending and of common assignee herewith, and are incorporated herein by reference.

There are times when a locked-up mode of operation is desirable. By moving shift collar 78 to the left as shown in FIG. 1, cage 68 will be carried to the locked-up position wherein drag shoe 80 is disengaged from frictional contact with wear ring 82 and tabs 70 are engaged in openings 58. Rollers 72 may or may not be carried with cage 68. In either event, cage 68 and rollers 72 are rotatable with extension 60. As extension 60 overruns, rollers 72 will wedge on the opposite side of cam 64 between inner race 66 and outer race 62, engaging clutch 74. Torque will be transferred both to output shaft 52 and through clutch 74 to output shaft 54. In this locked-up mode of operation, engine braking is provided by both the front and rear wheels as the vehicle descends a steep hill.

Collar 78 may be moved while the vehicle is travelling at any speed. Thus it is not necessary to stop the vehicle in order to shift between the automatic and locked-up modes. Collar 78 may be shifted manually or by suitable power assist devices. Further, when a reduction unit is provided, collar 78 may be controlled for shifting into the locked-up mode when the reduction unit is shifted into low range. This would eliminate inappropriate operations, such as, for example, operating in locked-up mode on the highway. Structure providing suitable reduction units is disclosed in detail in the aforementioned Fogelberg application Ser. No. 572,690 filed Apr. 28, 1975 and in Holdeman application Ser. No. 621,194 filed Oct. 9, 1975. These applications are copending and of common assignee herewith, and are incorporated herein by reference.

FIG. 3 shows a modified form of the invention. In the rightward position establishing the automatic mode, drag shoe 80 is in frictional contact with wear ring 82 so as to bias cage 68 to housing section 22. When shift collar 78 is moved to the leftward position establishing the locked-up mode, drag shoe 80 is out of frictional contact with wear ring 82 and tabs 70 are in frictional contact with either outer clutch race 62 (not shown) or, preferably, with a friction ring 84 carried by outer race 62. Cage 68 is not engaged with extension 60 directly, but rather is frictionally biased to outer race 62. Clutch 74 will function in the manner noted regarding operation in the locked-up mode.

Another modified form of the invention is shown in FIG. 4. A plurality of friction elements 86 are carried by cage 68 in frictional contact with outer race 62. Collar 78 is slidable relative to cage 68 but is prevented from rotating relative thereto. In the position shown, drag shoe 80 is in frictional contact with collar 78. Friction between drag shoe 80 and collar 78 is greater than friction between elements 86 and outer race 62. Thus, cage 68 is effectively biased to housing section 22 to establish the automatic mode. By moving collar 78 rightwardly, frictional engagement with drag shoe 80 is broken, and cage 68 is effectively biased to outer race 62 to establish the locked-up mode. It should be understood that cage 68 could be the movable element, if desired.

While a preferred embodiment of the invention has been shown and described, this is illustrative and may be modified by those skilled in the art without departing from the scope thereof, which is to be limited only by the claims herein.

We claim:

1. A torque transfer assembly comprising a housing, an input shaft and first and second output shafts supported for forward and reverse rotation in said housing, and means coupling said input shaft with said output shafts for transfer of torque thereto, said coupling means including an overrunning clutch having wedging means movable between first and second clutch engaging positions wherein torque is transferred to said second output shaft and a clutch disengaging position wherein torque is not transferred to said second output shaft, and means engageable with said housing for biasing said wedging means toward said first and second clutch engaging positions respectively upon said forward and reverse rotation, said biasing means being engageable with said second output shaft for biasing said wedging means toward said second and first clutch engaging positions respectively upon said forward and reverse rotation.

2. The invention of claim 1, said biasing means being selectively engageable with said housing and with said second output shaft for biasing said wedging means.

3. The invention of claim 1, said biasing means being frictionally engageable with said housing and with said second output shaft for biasing said wedging means.

4. The invention of claim 2, said biasing means being selectively frictionally engageable with said housing and with said second output shaft for biasing said wedging means.

5. In a four-wheel drive vehicle having a transfer case for transferring rotary motion from a source of power to first and second pairs of traction wheels; the combination wherein said transfer case comprises a housing, an input shaft and first and second output shafts rotatable in said housing, and means in said housing for transferring rotary motion from said input shaft to said output shafts, said transferring means coupling said input shaft with said first output shaft and including an overrunning clutch coupled with said second output shaft, said clutch having first and second rotatable elements defining first and second clutch races, a roller cage, a plurality of rollers carried by said cage between said clutch races for relative movement between two clutch engaging positions, and means fricitionally engageable with said housing for biasing said rollers toward one of said clutch engaging positions upon rotation of said first element, rotation of said second element faster than said first element tending relatively to move said rollers away from said one engaging position, said biasing means being engageable with said second element for biasing said rollers toward the other of said clutch engaging positions.

6. The invention of claim 5, said biasing means being selectively engageable with said housing and said second element.

7. The invention of claim 5, said biasing means being frictionally engageable with said second element for biasing said rollers toward the other of said clutch engaging positions.

8. The invention of claim 7, said biasing means being selectively frictionally engageable with said housing and said second element.

9. The invention of claim 6, said roller cage being movable between first and second positions respectively effecting said engagement of said biasing means with said housing and second element.

10. The invention of claim 6, said roller cage being in engagement with said housing and second element for effecting said engagement of said biasing means.

11. The invention of claim 10, said roller cage being selectively disengageable with said housing.

12. Power transmission apparatus especially adapted for driving a motor vehicle having first and second ground engaging elements, said apparatus including a rotary input member adapted for connection to a source of power and rotary output means adapted for connection to said ground engaging elements, said rotary output means including a primary rotary member providing a driving connection for said first element and an auxiliary rotary member providing a driving connection for said second element, said auxiliary member being coupled to said primary member by means of a clutch arranged to permit overrunning of said auxiliary member with respect to said primary member, first biasing means arranged to provide a force tending to condition said clutch to prevent overrunning of said primary member relative to said auxiliary member, and second biasing means arranged to provide a force tending to condition said clutch to prevent overrunning of said auxiliary member with respect to said primary member.

13. Power transmission apparatus comprising a housing, a first element supported for rotation in said housing and defining a plurality of cam surfaces, a second element supported for rotation in said housing and defining an annular surface, an annular cage, a plurality of rollers supported by said cage and subject to rotational displacement therewith relative to said elements between a central freewheel position and two positions in which said rollers are in wedging engagement with said surfaces, and means responsive to rotation of one of said elements relative to said housing in a given direction for biasing said cage into rotational displacement toward one of said engaging positions, said biasing means being responsive to relative rotation of said elements with at least one of said elements rotating in said given direction for biasing said cage into rotational displacement toward the other of said engaging positions.

14. The invention of claim 13, said biasing means including a first biasing element in frictional contact with said housing for biasing said cage into rotational displacement toward said one of said engaging positions.

15. The invention of claim 14, said biasing means including a second biasing element in contact with one of said rotational elements for biasing said cage into rotational displacement toward said other of said engaging positions.

16. The invention of claim 15, said second biasing element being in contact with said second rotational element.

17. The invention of claim 15, said second biasing element being in frictional contact with said second rotational element.

18. The invention of claim 15, said cage being movable for selectively effecting said biasing.

19. The invention of claim 15, said first biasing element being movable for breaking said fricitional contact whereby its biasing is disabled.

* * * * *